United States Patent [19]

McCann, Jr. et al.

[11] 3,774,165

[45] Nov. 20, 1973

[54] APPARATUS FOR PROCESSING THE FLOW OF DIGITAL DATA

[75] Inventors: Paul A. McCann, Jr., Temple City; Walter W. Fisher, Northridge, both of Calif.

[73] Assignee: The United States of America as represented by the Secretary of the Navy, Washington, D.C.

[22] Filed: Aug. 2, 1972

[21] Appl. No.: 277,458

[52] U.S. Cl. .............................................. 340/172.5
[51] Int. Cl. .............................................. G11b 5/00
[58] Field of Search .............................................. 340/172.5; 235/151.11, 151.3

[56] References Cited

UNITED STATES PATENTS

| | | | |
|---|---|---|---|
| 3,293,613 | 12/1966 | Gabor | 340/172.5 |
| 3,473,153 | 10/1969 | Lehnhardt et al. | 340/172.5 |
| 3,569,934 | 3/1971 | Parr, Jr. | 340/146.1 |
| 3,569,941 | 3/1971 | Randall et al. | 340/172.5 |
| 3,603,770 | 9/1971 | Reins, Jr. | 235/151 |
| 3,657,704 | 4/1972 | Boehm | 340/172.5 |
| 3,688,275 | 8/1972 | Fredrickson | 340/172.5 |

*Primary Examiner*—Paul J. Henon
*Assistant Examiner*—James D. Thomas
*Attorney*—Richard S. Sciascia et al.

[57] ABSTRACT

An apparatus for processing the flow of digital data encoded upon a tape, but not the information in the digital data, comprising a plurality of digital circuits, and adapted to be connected at its input end to a tape deck containing the tape and at its output end to output interfacing equipment, such as a servo, comprising a clock source for generating the clocking pulses used to control the timing and sequencing of the operations of the digital circuits, which timing may be different from the rate at which the digital data were encoded upon the tape, and an input buffer, connectable to the tape deck, which receives the digital data from the tape in the tape deck. The apparatus further comprises a tape control, connectable to the tape deck, and whose control inputs are derived from the tape deck, which controls the sequencing of the write-in and read-out of the digital data, and a memory which comprises a memory storage, a memory control, and a memory address. The memory is in the form of a double buffer in that digital data may be simultaneously written into one portion, or buffer, of the memory storage and read out of the other buffer. The apparatus further comprises, an output register for accepting the digital data from the memory, and an output control which generates, as an output signal, a strobe pulse to the memory address, which causes reading out of data from the memory storage and distributing this data into its proper place in the output register. A line driver and receiver whose inputs are (1) digital data from the output register, and (2) an "output acknowledge" signal from the output control, which causes delivery of the digital data to the output interfacing equipment and the outputs of the line driver and receiver, also forms part of the apparatus.

5 Claims, 7 Drawing Figures

BASIC APPARATUS FOR PROCESSING THE FLOW OF DIGITAL DATA

BASIC APPARATUS FOR PROCESSING THE FLOW OF DIGITAL DATA

APPARATUS FOR PROCESSING THE FLOW OF DIGITAL DATA INCLUDING PARITY CIRCUITS

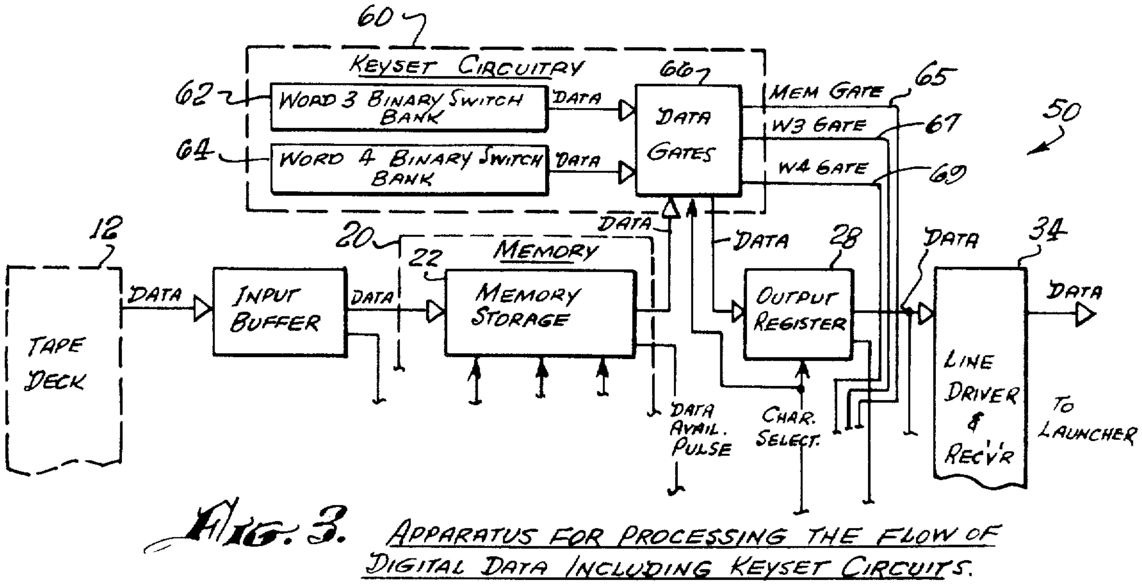
FIG. 3. APPARATUS FOR PROCESSING THE FLOW OF DIGITAL DATA INCLUDING KEYSET CIRCUITS.
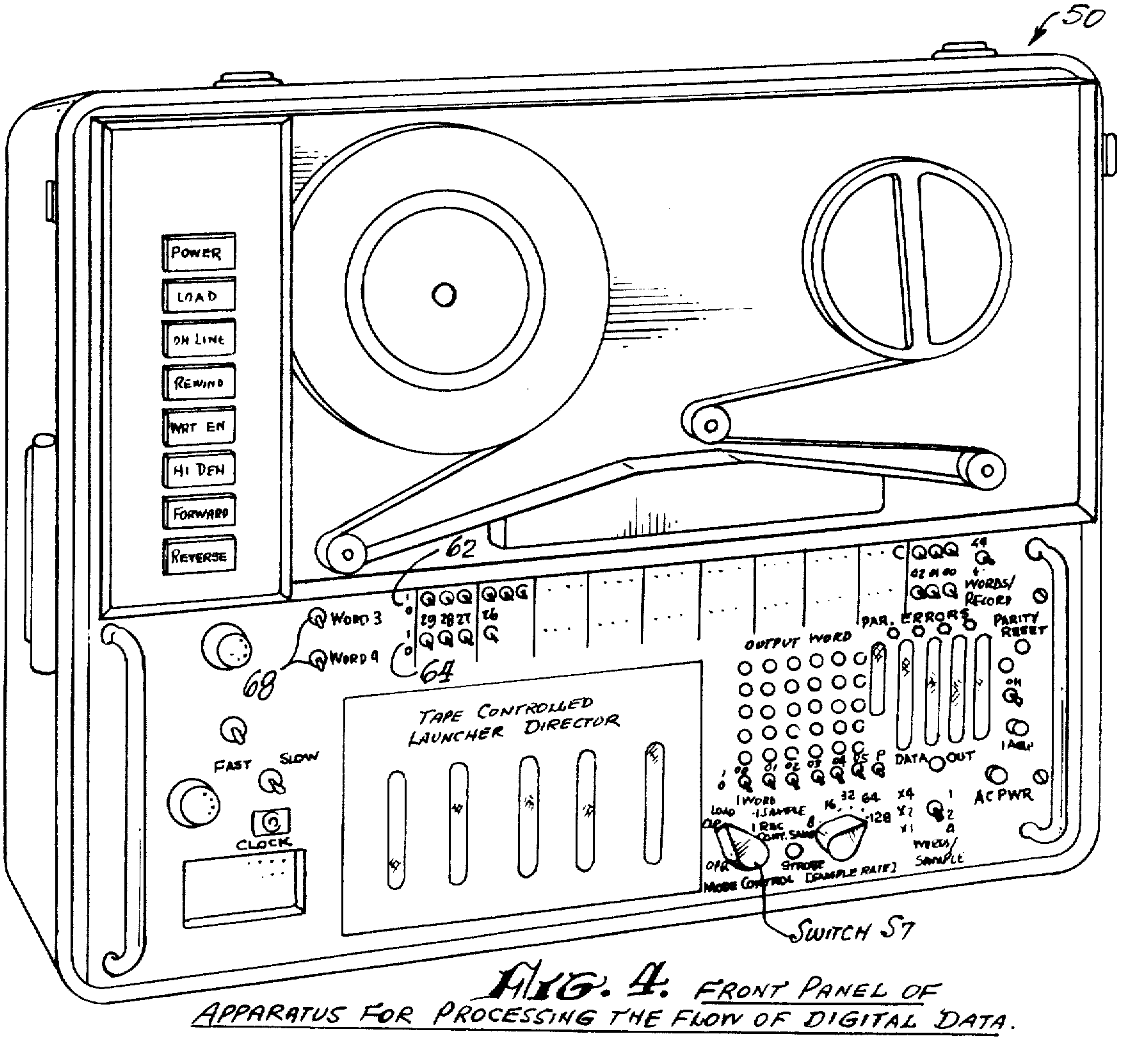
APPARATUS FOR PROCESSING THE FLOW OF DIGITAL DATA.

APPARATUS FOR PROCESSING THE FLOW OF DIGITAL DATA

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

There is no known device similar to the apparatus of this invention that simulates the input/output of a digital computer without itself being a digital special purpose processor or computer.

The generation of simple deterministic signals such as step, constant velocity, and simple harmonic motion (sinusoidal) functions, to provide digital command signals has been done in the prior art. There are at least three methods possible:

1. Modify existing analog (synchro) motor-driven control apparatus such that a pair of digital shaft angle encoders are driven via gearing to provide the appropriate digital commands.
2. Employ synchro-to-digital data converters in conjunction with conventional analog (synchro) directors to provide the appropriate digital commands.
3. Construct a special-purpose processor that implements logically the required algorithms to produce, format and furnish time synchronization for the appropriate digital commands.

All the aforedescribed prior art apparatus suffers from the deficiency that the number, kinds, and resolution of functions possible to the user are severely limited by mechanical, electrical, or electronic restraints of the peculiar implementation. Also, the bulk, weight and complexity of operation of any of the existing modified analog directors would be a disadvantage.

A special purpose processor is limited to a repertory of fixed-wired algorithms and instruction sets. To reprogram requires either rewiring or replacement of electronic subassemblies, or both.

A miniature general purpose computer, although capable of performing many of the tasks listed hereinabove, requires some means of loading raw data and the instruction set (program) for compilation and execution. Since the typical media for such inputs are punched cards, perforated tape, or magnetic tape, used in conjunction with a teletype or other keyset device, expensive and bulky peripheral gear is required. Also, the complied program would be stored on one of the media mentioned above (most likely magnetic tape) for execution in real-time on-line with the servomechanism. Unless actual on-line computation is required for alteration of variables in real-time (control function), it is clear that what is required is only the prepared tape that contains executed real-time data sequences, and a transport with store, format, and control electronics.

SUMMARY OF THE INVENTION

The invention relates to an apparatus for processing the flow of digital data encoded upon a tape, but not the information in the digital data, comprising a plurality of digital circuits, and adapted to be connected at its input end to a tape deck containing the tape and at its output end to output interfacing equipment, such as missile launcher, and comprises, first, a clock source for generating the clocking pulses used to control the timing and sequencing of the operations of the digital circuits, which timing may be different from the rate at which the digital data were encoded upon the tape. An input buffer, connectable to the tape deck, receives the digital data from the tape in the tape deck. A tape control, connectable to the tape deck, and whose control inputs are derived from the tape deck, controls the sequencing of the write-in and read-out of the digital data.

The apparatus further includes a memory comprising:

1. a memory storage connected to, and which receives the digital data from the input buffer;
2. a memory control, whose input is connected to the tape control and whose output is connected to the memory storage, for controlling, by means of the tape control, the write-in of data into, and the read-out of data from, the memory storage; and
3. a memory address, having, as three of its input signals, signals from the memory storage and from the tape and memory controls, for generating the memory addresses for the write-in and read-out of digital data.

The memory is in the form of a double buffer in that digital data may be simultaneously written into one portion, or buffer, of the memory storage and read out of the other buffer.

An output register, connected to the memory storage, accepts the digital data from the memory. An output control having as inputs the digital data available from the memory storage and a signal from the tape control generates, as an output signal, a strobe pulse to the memory address, which causes reading out of data from the memory storage and distributing this data into its proper place in the output register.

The apparatus further comprises a plurality of line drivers and a receiver whose inputs are: (1) digital data from the output register; (2) an "output acknowledge" signal from the output control, which causes delivery of the digital data to the output interfacing equipment; and, (3) "Output Data Request" received from peripheral equipment. The outputs of the line drivers are delivered to the peripheral interfacing equipment. The output of the receiver is delivered to the output control to instigate the delivery of data (and the output acknowledge signal) to the peripheral equipment.

OBJECTS OF THE INVENTION

An object of the invention is to provide an apparatus for simulating the normal input/output buffer channel of a general-purpose computer, selectable between "slow" and "fast" interface options.

Another object of the invention is to provide an apparatus for reading data from a magnetic tape previously prepared by a computer, and for furnishing those data to a user (peripheral) in a manner simulating the output from a computer.

Yet another object of the invention is to provide an apparatus wherein the data rate is adjusted by the user, and is independent of tape speed.

A further object of the invention is to provide an apparatus for interfacing with, and injecting digitally generated and formulated electrical signals into, servomechanisms or similar machines for the purpose of testing their dynamic response characteristics to sampled data.

Other objects, advantages and novel features of the invention will become apparent from the following detailed description of the invention, when considered in conjunction with the accompanying drawings, wherein:

BRIEF DESCRIPTION OF THE DRAWINGS

FIG. 3 is a block diagram, similar to FIG. 2, of a still more sophisticated embodiment, including keyset circuitry for manually inserting one or two words of data of the four words used.

FIG. 4 is a drawing of the front panel of the apparatus.

DESCRIPTION OF THE PREFERRED EMBODIMENTS

Figure 1:
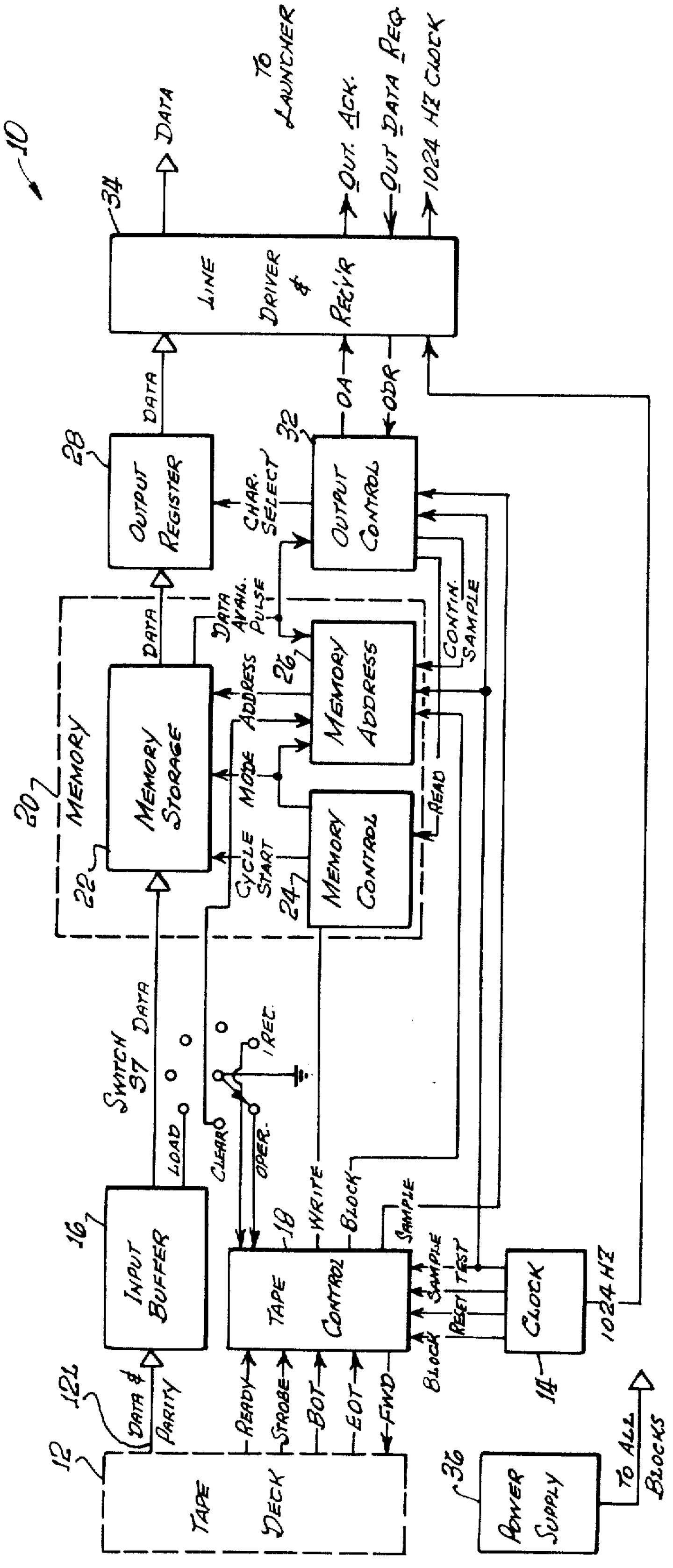
FIG. 1 is a block diagram of the basic apparatus for processing the flow of digital data.

Referring now to FIG. 1, this figure shows an apparatus 10 for processing the flow of digital data, encoded upon a tape, but not the information in the digital data, comprising a plurality of digital circuits, and adapted to be connected at its input end to a tape deck 12 containing the tape and at its output end to output interfacing equipment, such as a servo or missile launcher (neither of which is shown).

Input to the equipment is of a standard ½ inch magnetic tape, 2 mils thick, on a 7 inch reel. Format is 7-track, IBM compatible, having 6 bits of data plus parity, recorded at 556 characters per inch, 220 or 440 characters per record and with ¾ inch inter-record gaps. Tape speed is 12½ inches per second.

The 220 or 440 characters represent 11 or 22 successive four-word samples of data to be delivered to the output interface equipment at a precisely controlled rate. The rate is front-panel selectable at 8, 16, 32, 64, or 128 up-dates per second. An "updating" is the re-supplying of new data to the user. Each 20-character sample is to be reformatted into 4 output words (5 characters each) of 30 bits per word to be compatible with a general-purpose computer format. Alternately, via front panel control, the unit can deliver 22 or 44 two-word samples or 44 or 88 one-word samples. When delivering two-word samples, the output rate is twice that for four-word samples, while one-word samples are delivered at four times the rate of four-word samples.

The output is front-panel selectable to simulate a "fast" or "slow" interface of the Naval Tactical Data System (NTDS) computer. The data that is packed on the tape of course could be packed in several densities, the standard medium density being used for this invention.

Updating may happen at completely different times than the reading of tape, because of the fact that 11 complete samples are read every time that a tape record is read, this data being stored in a memory, so that all the information need not be dumped as read, there being on one record enough for updates. This allows the apparatus to be completely asynchronous between the tape and the output. It is one of the important features. In fact, it is also a variable feature, that is, the number of words per record, so that this is an internal update, bearing little resemblance to the actual output to the user. Asynchronism in this case, meaning that the user can demand data independent of whether the tape unit is pulling at that particular time or not, or independent of the tape speed, etc. This pertains to the standard asynchronous UNIVAC data exchange also, where the standard user will supply these definitions, but that's an important feature there. The user requests data asynchronously with what is happening in the machine, and then the machine supplies data as quickly as it can in response to that request.

A clock source 14 generates the clocking pulses used to control the timing and sequencing of the operations of the digital circuits, which timing may be different from the rate at which the digital data were encoded upon the tape. The clock is highly accurate, being controlled by a crystal. The oscillator output is counted down to 1024 Hz. This clock signal may be delivered to external equipment.

An input buffer 16, which is connectable to the tape deck 12, receives the digital data from a tape in the tape deck. Six data bits and a parity bit are received from the tape deck through connector 12L. Each input is via a twisted pair with the return side connected to ground very near the input gates.

A tape control 18, connectable to the tape deck 12, and whose control inputs are derived from the tape deck, and from the clock, controls the sequencing of the read-out of the digital data. The tape control circuit 18 accepts the transport "ready" level, "beginning of tape" (BOT) level, "end of tape" (EOT) pulse and the data "strobe" pulses from the tape transport unit of tape deck 12. The "transport ready" signal refers to the signal marked "ready" in FIG. 1. It tells the tape control 18 that the tape itself has been tensioned and is now ready to be pulled forward and read.

With the front panel control switch S7 in other than LOAD position, tape input data is delivered to the memory unit 20. With switch S7 in the LOAD position, the tape data is disabled and, instead, front panel switches apply binary data and a parity bit to the memory input, for the purpose of testing memory action.

After the tape forward command (FWD) is given, the tape data strobe signals are received and passed on to the memory unit 20 to cause received data to be stored. Tape "FWD" is simply a command from the tape control 18 to the tape deck 12 to advance the tape. A strobe is simply a pulse that occurs at a certain time in a time sequence of events, and its purpose is to effect a transfer of data. It is a voltage pulse which has a specifice width and appears in a specific occurrence in time with rspect to other events that are happening, and it causes subsequent action in logic. It is a pulse except that it has an interrogation quality about it. It causes an effect. It is possible, however, that noise will appear on the tape data strobe line during tape start-up. Therfore, the line is ignored for a prescribed time period after the tape forward command (FWD) is given. This delay is normally 24 msec. However, at the beginning of tape (BOT), the delay is 120 msec. These delays are produced by the tape control. The tape unit provides a signal (BOT) which becomes false after the tape is started. This enables the appropriate time interval. The selected time interval is initiated by the clock (block) pulse. The term "block" designates a block of data that exists on the tape, consisting of one record. The rate of reading of the records is therefore under control of the clock.

Following the delay interval, the tape control 18 senses the occurrence of tape data strobe pulses. 220 or 440 data characters, with accompanying strobes, are received and stored in the memory 20 during each reading of the tape record.

When all characters have been received, it is desired to drop the tape "forward" command after a period of 16 strobe time-intervals. This is accomplished by the tape control 18.

Discussing very briefly at this point the relationship of the tape control circuit 18 to the memory circuits 20, in addition to controlling the tape unit 12, the tape control circuit also delivers a block pulse to reset the counters of the memory address 26. It also enables the delivery of data to the launcher. These sample pulses are started upon the initiation of the reading of the second tape record. It is necessary to permit one tape record to be read and stored before attempting to read data out; otherwise, the read-out would consist of invalid old data which is not yet updated.

With the switch S7 placed in the LOAD position, the strobes can be produced manually be depressing the strobe push-button in the clock circuit 14. With switch S7 in this position, the tape data input is simulated by 6 toggle switches. This data is advanced into the memory 20 and the memory address 26 advanced with each pressing of the push-button.

This feature permits known data to be entered into the memory for test purposes. When the end of tape is reached, the tape deck 12 produces an EOT pulse (End of Tape). This stops further operation of the tape control 18 until the operator rewinds the tape and again causes the tape "ready" signal to appear.

A memory 20 comprises a memory storage 22 connected to, and which receives the digital data from, the input buffer 16. The core memory storage 22 has a capacity of 1024 words of 7 bits, 6 data and one parity. The memory 20 operates as a double buffer in that tape data is written into one portion while data is simultaneously being read out of another. This is necessary since the memory 20 must be synchronous with the tape unit 12 for writing and with the clock 14 and launcher for reading. Input data consists of 220 or 440 characters. Therefore only 440 to 800 of the 1024 available memory locations are utilized in the present system. "Write" in the context of this invention means to transfer a datum from the tape into memory. "Read" means to remove the datum from the memory and to supply it to the output.

A memory control 24, whose input is connected to the tape control 18, and whose output is connected to the memory storage 22, controls, by means of the tape control, the write-in of data into the memory storage and the read-out of data from the memory storage. The memory control circuit 24 responds to the "read" and "write" strobes, and generates the required "mode" command and "cycle start" pulse for the memory storage 22. The "write" circuit operates as described hereinabove regardless of the condition of the "read" circuit. The "read" circuit, however, will be inhibited and delayed if "read" and "write" strobes are received simultaneously.

The "mode" command relates to either read or write memory operation. The "mode" of the device, as selected by switch S7, relates either to the OPERATE mode, wherein data is supplied from the tape to the user through the reformatting and memory electronics 20, or to one of the test and maintenance modes of the machine, which allow cycling manually through the memory to check the memory out, to check the read electronics out, or to manually program by ket set characters into the memory and deliver these quantities manually to a user. So there are several different modes of operation available in the invention besides the pure tape-to-user mode.

The "cycle start" signal causes the memory 20 to execute either the read or write function as determined by the "mode" signal.

The memory address circuit 26 consists of one 9-bit binary counter for generating the memory address for writing. This counter output is applied to the core memory 22 each time that the write "mode" signal is true and advances each time it goes false. The second 9-bit counter in the memory address 26 generates the address for reading the core. It is connected to the memory storage 22 when the "mode" level is false, and is advanced by the data pulse received from the output control 32, to be described. Both counters are reset by the "block" pulse from the tape control unit 18.

As mentioned hereinabove, the memory 20 provides a double buffer in that a record can be read from tape, and stored, simultaneously with the reading of a previously stored record. This double buffering is produced by an additional address bit produced by a flip-flop which is toggled each time that the above described address counters are reset. With the flip-flop set in one state, data are written into one portion of memory 20 and read out from a second portion. For the next cycle of operation, the flip-flop changes state, so read-out is from the first portion of memory 20 which was prviously up-dated. In like manner, the second portion of memory receives new data.

With switch S7 in the "clear" position, pressing the strobe push-button will reset the counters and toggle the flip-flop. With switch S7 in the "continuous sample" position (see FIG. 2C), reset pulses are received from the output control 32, as will be explained hereinbelow.

In summary, the three memory circuits, memory storage 22, memory control 24, and memory address 26 are a module in a sense, and, essentially, all of them together form the memory 20. The memory storage 22 stores the information, the memory address 24 permits accessing to the memory locations, and the memory control 26 allows asynchronous writing into and reading from the memory storage 22.

An output register 28, connected to the memory storage 22, accepts the digital data from the memory 20. It accepts the output data, 6 bits plus parity, from the core memory storage 22. It stores five of these data characters, a total of 30 bits, in flip-flops.

The data on the tape is completely the same, bit by bit, when it is all put back together at the output of the output register 28 as it was coming out of the originating computer which output it to the tape write electronic unit, 30-bit words which had to be packed 7 bits at a time, 6 data and a parity, onto the tape. By means of this invention, this information is read off from the tape and supplied asynchronously to an output user back into a 30-bit format at his desired rate, as set into the rate control switch in the clock 14.

An output control 32 has as inputs the "data available pulse" from the memory storage 22 and a "sample" signal from the tape control 18, and generates, as an output signal, a strobe pulse to the memory address 26, which causes reading out of data from the memory storage and distributing this data into its proper place in the output register 28.

In more detail, the purpose of the output control 32 is to generate the strobe pulses for reading data from the memory 20, to distribute each of the five 6-bit characters rceived from memory to its proper place in the output register 28, to receive the "output data request" (ODR) signal from the launcher, and to generate "output data acknowledge" (OA) signals to deliver each of the assembled output words to the launcher.

Each output data cycle is initiated by receipt of a "sample" pulse from the clock 14. Eleven or 22 "sample" pulses are generated following each "block" pulse previously described.

The information on the tape can be any information, even noise, if desired. Assuming the output interface would be a servo as an example of a specific use, there would be position and velocity information on the data tape to be read into the apparatus of this invention. Such information would be put in sampled data format, that is the sample increments at the update times of interest to be furnished to the servo would be put on the data tape. Now this data would be read by the device, and then put together into the output register 28 under the control of the output control 32 in such a way that the servo receives 30-bit words containing the velocity and position information. Output data format would be a 30-bit word, and it could be programmed with a velocity and position information plus any identifier information necessary to flag whether it is azimuth, or elevation, etc.

So, one of the differences of this invention over the prior art is that in format 6 bits of information can be put on the tape plus a parity bit, and the output requires 30 bits of data in a certain format that is preassigned for the computer that is being simulated, so that the data is of two completely different sorts. The second thing that is different about this invention is that the tape speed and the rate at which the data is read off the tape is completely different from the rate at which the user is taking the data out of the output register 28. So here there is a complete independence, the control of the tape unit 12 is completely independent of the output data by the user, and this is an important feature. In this invention, the output rate is under the user's control and is independent of the tape speed and the tape control system.

The term "output acknowledge" (OA), (the output of the output control 32), means that a request for data has been received by the apparatus 10 and that the apparatus 10 has put the data on the output lines. The data, of course, is a 30-bit word. This means that the user is now flagged to take the 30 data bit lines and interpret them, that is, read them at that moment. ODR is the "output data request" signal which the user, the launcher in the figures, raises when he wants data to be supplied to him. He raises the ODR signal and holds it high until the unit 10 raises the OA signal, whereupon he stores the data and momentarily drops his ODR signal.

When the apparatus of this invention is to be used with a sample-data servomechanism, the data to the servomechanism must arrive such that the time intervals between up-date words are very precise. There cannot be excessive jitter, that is, random motion in time, between word groups, otherwise servo control will rapidly degrade by the noise so introduced.

An important feature of the invention, therefore, is that the output data rate is controlled by a precise, quartz crystal clock and is in no way dependent upon or subject to the time fluctuations which are inherent in tape transports. The user has the ability to request data asynchronously just as with a computer output channel.

The multiplication rate is selectable on the control panel, but the user cannot alter the basic occurrence rate of data read from tape. The user can double the rate, he can halve the rate, or change it by some binary factor. The data becomes time-compressed or time expanded, depending on whether the use is going up or down from the rate on the tape, and therefore it is not real time anymore, but it can be done. But if he wanted to change the data itself, he would have to put a new preprogrammed tape into the tape deck 12.

The output data rate is controlled by a front panel switch, 72 in FIG. 4, which permits the user to select the desired rate. This causes the basic crystal oscillator to be counted down to the desired frequency. For the applied embodiment, the selectable rates are 16, 32, 64, or 128 updates per second. A second multiplier switch applies a factor of 1, 2 or 4 depending upon the number of words per output buffer. It should be pointed out that the output rate is in no way dependent upon the rate at which the data is issued from the magnetic tape, except that the output rate cannot exceed the average rate of tape data, and maintain the original information content in a real time sense.

A line driver and receiver 34 has as inputs (1) digital data from the output register 28; (2) an "output acknowledge" signal from the output control 32 which causes delivery of the digital data to the output interfacing equipment; and (3) an "output data request signal" from the user. The outputs of the line driver and receiver 34 comprise: (1) digital data; (2) an "output acknowledge" signal; and (3) a clock pulse, when required.

Figures 2, 2A, 2B, 2C:
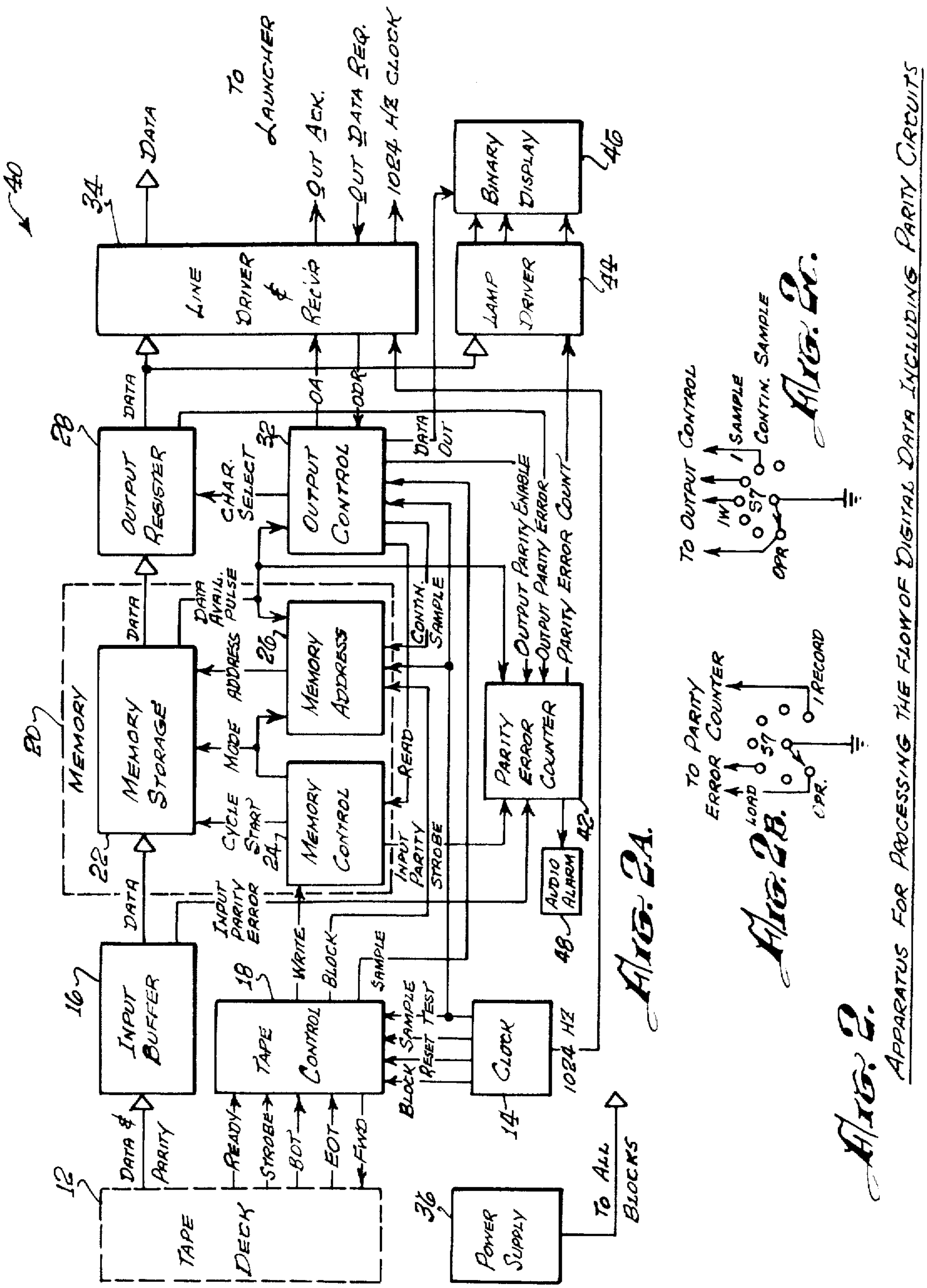
FIG. 2 is a similar block diagram comprised of 2a–2c, but including parity, alarm, and display circuits.

Referring now to FIG. 2, this figure shows a more sophisticated embodiment of an apparatus 40 for processing the flow of digital data. It includes a parity error counter 42 which counts parity errors, displays the count on the binary lamps of a binary display 46, also shown in FIG. 4, and, when the count reaches 15, a gate in the parity error counter 42 stops further counting, and turns on the alarm 48.

The parity error counter 42 operates on input data if the switch S7 is on OPERATE, LOAD or 1 RECORD, i.e., when data is being read into the memory 20. It operates on memory output data when the switch S7 is on 1 WORD, 1 SAMPLE or SAMPLE CONTINUOUS.

The lamp driver 44 contains 34 transistors, each having its emitter grounded, its base connected through a 1500 ohm resistor to an input terminal, and its collector connected to a lamp of the binary display 46 on the front panel, as shown in FIG. 4. The lamps are returned to +3VDC. 30 of the inputs connect to 30 quad latch outputs to display the 30-bit output.

Referring now to FIG. 3, this figure shows a still more sophisticated embodiment of the apparatus 50, which is similar to the embodiment 40 shown in FIG. 2, but with the addition of three more blocks, involving keyset circuitry 60, in the upper portion of the figure. That part of the embodiment 50 not shown in FIG. 3 is identical to the embodiment 40 shown in the lower part of FIG. 2.

The three circuits involved in the keyset circuitry are the Word 3 and Word 4 banks of binary switches, 62 and 64, respectively, and the data gates 66. These circuits allow the performance of a combination of manual programming simultaneously with automatic programming.

Referring now to FIG. 4, there are two banks or rows, 62 and 64, of 30 keyset toggles, corresponding to Words 3 and 4. There are also two enable switches 68, one for each keyset bank, 62 and 64. An operator may manually nter data via the keysets, 62 and 64, and replace prerecorded data in either Word 3 alone or in Words 3 and 4 (not just Word 4 alone). Words 1 and 2 remain unaffected. If only a single word is recorded, keysets have no effect, even if either switch 68 is enabled. If a tape is used which has only two-word samples recorded, then the Word 3 and Wor 4 may be added to the format (rather than replacing Words 3 and 4, as described hereinabove).

With the switches 68 in the OFF POSITION, ONLY DATA READ FROM TAPE ARE SUPPLIED TO THE LAUNCHER. As described hereinabove, this data can consists on 1, 2 or 4 words (channels) of data. If either or both switches 68 is placed in the ON position then, if the tape contains 4 words per sample, the corresponding Words 3 or 4 delivered will be inhibited and replaced by the words set into the keyset switches, 62 or 64. This allows the operator to determine and set-in data he wants to deliver in Words 3 and 4 regardless of the data previously recorded on the tape for these words.

If the tape contains 2 words per sample, then they will be delivered to the launcher followed by the keyset Words 3 and 4. It should be noted that, in this case, the data from keyset Word 4 cannot be accepted unless the enabling switch 68 for Word 3 is ON.

If the tape contains only one word per sample, then the position of the keyset switches 68 is ignored. Only the taped word is delivered to the launcher.

The Word 3 and Word 4 gates consist of 11 gates, each of which can select a 6-bit character for application to the output register 28. One of the 6 bit inputs is from the core memory 20. This input is enabled when the output control 32 produces the memory gate signal 65. Also, the gate signals W3 Gate and W4 Gate, 67 and 69, respectively, are produced if the Word 3 or Word 4 ON-OFF enabling switches 68 are ON. This allows the character 1–5 signals to successively gate 6 bits at a time from the keyset toggle switches 68 (on the front panel) into the output register 28.

The apparatus 50 shown in FIG. 3 may also contain a logic circuit (not shown) which detects an industry-standard file mark recorded on tape. When a file mark is encountered, the system stops until restarted by the operator. The apparatus 50 can detect a standard file mark and file gap situation, so that many different tests may be put on the tape, and it will automatically detect the gap and mark and stop. The tape can then be restarted with a control so that each specific test on the tape can be demarked. It is just a standard IBM file gap or mark that is written on the tape. It is a binary 15 followed by its longitudinal parity character. There is also put on the tape a 3½-inch leader, which is the gap before that code is reached. The regular gap of ¾ inch allows the tape transport to start and stop within that ¾ inch. The 3½-inch leader indicates that there is no data for many gaps, so that when these two unique characters are detected, it simply causes the transport to stop.

If a file mark is encountered while the tape is being read and when the mode switch S7 is in the OPERATE position, the system will stop. The operator can restart the system by moving the mode switch S7 away from and then return back to the OPERATE position. The file mark is recognized by detecting a one-character (plus parity) record.

By means of this invention, non-deterministic (arbitrary) realtime numerical data, as well as deterministic data may be supplied to peripheral users. For example, use of pseudo-noise sequences for identification purposes is possible. Also, use can be made of inertially stabilized data abstracted from actual recordings environmentally modified ship's motion data.

The duration of run time of data that can be stored on each 7-inch reel, 600 ft. at 12 ½ inches per second, is dependent upon the sample rate and the number of words per sample. The useful range of run times for the prototype instrument ranges from 2 ½ hours at 8 updates per second to 2 ½ minutes at 256 updates per second per tape. This data density implies that an entire factory acceptance test (FAT), for a specific piece of equipment, could be prerecorded and stored on just a single magnetic tape. It takes about 5 minutes of computer time to prerecord an entire 7 inch reel.

Referring back to FIG. 2, the auxiliary features, such as lamp drivers 44 and binary display 46, parity error counter 42 and audio alarm 48, and the modes other than "operate" are not essentials, but enhance usefulness and aid in trouble-shooting.

Options or alternative methods of construction would consist of using a different medium from magnetic tape for bulk data storage. Currently, the only competitive medium of sufficient density and retrieval rate would be a disk file magnetic storage device. Existence of portable disk files are not known, but are possible.

A synchronous (continuous) tape transport is used in the apparatus 10, 40, and 50. However, an incremental transport could be used as well. Also, solid-state memory devices could be used instead of magnetic core devices as memory storage elements.

The length of a word is a variable. A 30-bit length was used in the applied embodiment. However, 36 bits is common to many computer systems, and could be used optionally.

The selectable rate is a variable. Virtually any number of rates could be made available by internal clock and counter circuitry. The maximum number of words to be outputed per buffer establishes the upper limit on the output rate.

An optional feature consists of an internally generated "Output Request" (ODR) signal for outputting data to users that normally do not provide "data request" signals, or for checkout of the unit without a user.

What is claimed is:

1. An apparatus for processing the flow of digital data, encoded upon a magnetic tape, but not the information in the digital data, comprising a plurality of digital circuits, and adapted to be connected at its input end to a tape deck containing the tape and at its output end to output interfacing equipment, such as a missile launcher, comprising:

a clock source for generating the clocking pulses used to control the timing and sequencin of the operations of the digital circuits, which timing is generally different from the rate at which the digital data were encoded upon the tape;

an input buffer, connectable to the tape deck, adapted to receive the digital data, in the form of words of binary information, from a tape in the tape deck;

a tape control, connectable to the tape deck, and whose control inputs are derived from the tape deck and from the clock source, which controls the sequencing of the read-out of the digital data;

a memory comprising:

a memory storage connected to, and which receives the digital data from, the input buffer;

a memory control, whose input is connected to the tape control and whose output is connected to the memory storage, for controlling, by means of the tape control, the write-in of data into the memory storage and the read-out of data from the memory storage; and a memory address, having, as three of its input signals, signals from the memory storage and from the tape and memory controls, for generating the memory addresses for the write-in and read-out of digital data;

the memory being in the form of a double buffer in that digital data may be simultaneously written into one portion, or buffer, of the memory storage and read out of the other buffer;

an output register, connected to the memory storage, for accepting the digital data from the memory;

an output control having as inputs a "data available" pulse from the memory storage and a signal derived from the clock, which generates, as an output signal, a strobe pulse to the memory address, which causes reading out of data from the memory storage and distributing this data into its proper place in the output register; and a line driver and receiver whose inputs are:

1. digital data from the output register;
2. an output acknowledge signal from th output control, which causes delivery of the digital data to the output interfacing equipment;

the outputs of the line driver and receiver comprising:

1. digital data;
2. an output acknowledge signal; and
3. a clock pulse, when required; and a power supply, connected to the clock and all the digital circuits, for supplying d-c and a-c voltages where required.

2. The apparatus according to claim 1, wherein the input buffer is adapted to receive at least one parity bit from the tape deck; and further comprising:

a parity error counter with the following input signals;

1. an input parity error signal from the input buffer;
2. an input parity strobe from the memory control;
3. available data from the memory;
4. an output parity enable signal from the output control; and
5. an output parity error signal from the output register;

the parity error counter having as an output signal the parity error count.

3. The apparatus according to claim 2, further comprising:

a lamp driving circuit, whose inputs are the parity error count signal and a signal from the output register; and a binary display, having as inputs output signals from the lamp driver and a data output signal from the output register.

4. The apparatus according to claim 3, further comprising:

an audio alarm, whose input is connected to the parity error counter, which emits an audible alarm signal when the parity error exceeds a predetermined level.

5. The apparatus according to claim 2, further comprising:

at least one bank of binary keyset switches, manually operated, for replacing at least one of the words of information on the tape;

a set of data gates, controlled by the output control, whose inputs comprise the data from the memory storage and from the one or more banks of keyset switches, and whose output comprises the desired words of data, the data prerecorded upon the tape and the data manually keyset.

* * * * *